United States Patent [19]

Murphy et al.

[11] Patent Number: 4,503,875

[45] Date of Patent: Mar. 12, 1985

[54] GAS HIGH-LOW PRESSURE CONTROL APPARATUS

[75] Inventors: Gerald J. Murphy; Walter E. Pilie', both of Houston, Tex.; Glenn Garaudy, Metairie, La.

[73] Assignee: Autocon, Incorporated, Houston, Tex.

[21] Appl. No.: 521,472

[22] Filed: Aug. 8, 1983

[51] Int. Cl.³ .............................................. F15B 5/00
[52] U.S. Cl. ........................................ 137/83; 137/85
[58] Field of Search ..................................... 137/83, 85

[56] References Cited

U.S. PATENT DOCUMENTS

| | | | |
|---|---|---|---|
| 2,284,795 | 6/1942 | Belaef | 137/83 |
| 2,834,361 | 5/1958 | Erbguth | 137/83 |
| 3,367,351 | 2/1968 | Smyers, Jr. | 137/83 |
| 3,525,351 | 8/1970 | Bowditch | 137/85 |
| 3,565,391 | 2/1971 | Zannini | 137/85 |
| 3,861,412 | 1/1975 | Fleischmann | 137/83 |
| 4,044,651 | 8/1977 | Warrick | 137/85 |
| 4,173,150 | 11/1979 | Gray | 137/85 |

Primary Examiner—Henry C. Yuen
Assistant Examiner—John Kwon
Attorney, Agent, or Firm—Fulbright & Jaworski

[57] ABSTRACT

A gas/oil high-low pressure control apparatus having a helical bourdon tube sensing a gas control pressure and a gap sensor connected to a pressure indicator and rotating between high and low set point flags in which the gap sensor controls a pilot actuated valve which in turn controls a gas supply. A pressure regulator is connected between the gas supply and the inlet to the gap sensor and the outlet of the gap sensor is connected to the valve. The gap sensor outlet also provides a regenerative feedback signal to the regulator for providing a snap acting closing operation of the valve when the gap sensor detects a set flag. The gap sensor is of a thermoplastic having an aligned inlet and outlet with a closible opening aligned with the inlet and the outlet for periodically cleaning the inlet and the outlet. The linkage between the bourdon tube and the gas sensor includes first, second and third links with a zero adjustment, a span adjustment and a linearity adjustment and an over-range protector.

11 Claims, 10 Drawing Figures

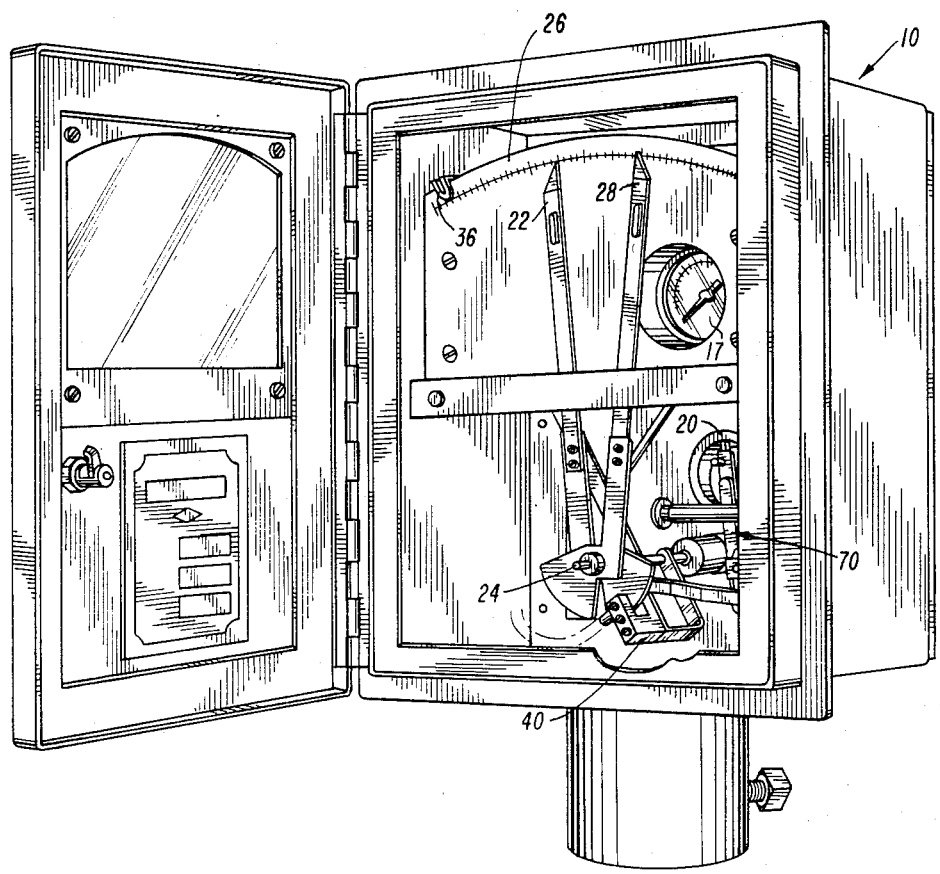
FIG. 1
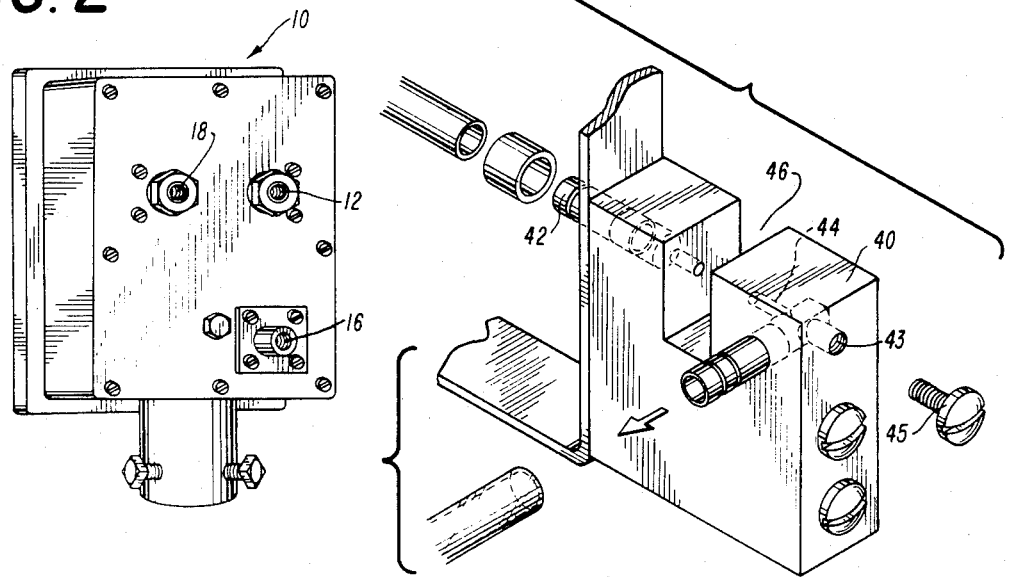
FIG. 2
FIG. 3

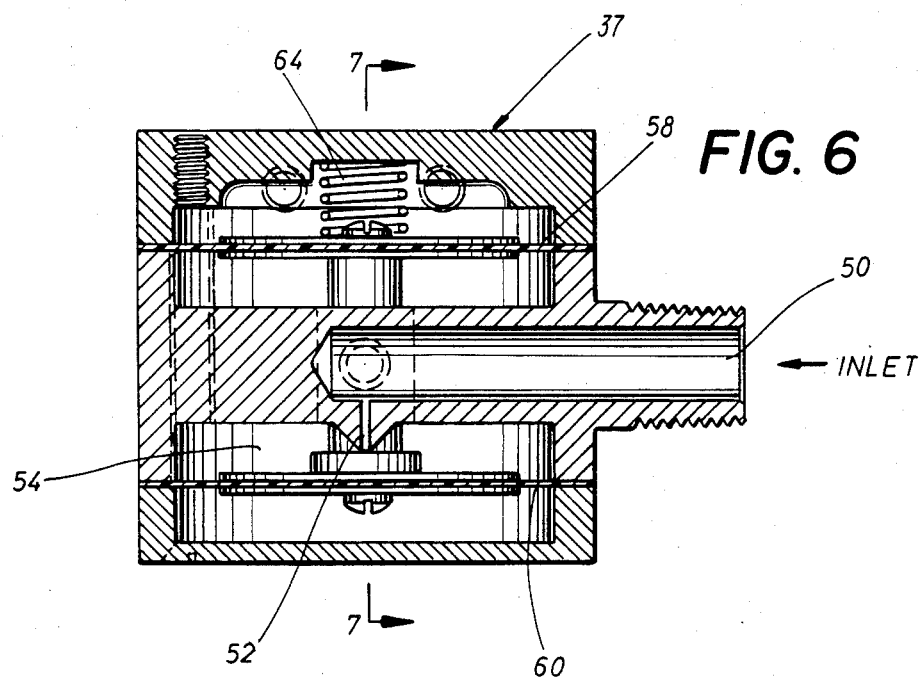
FIG. 6
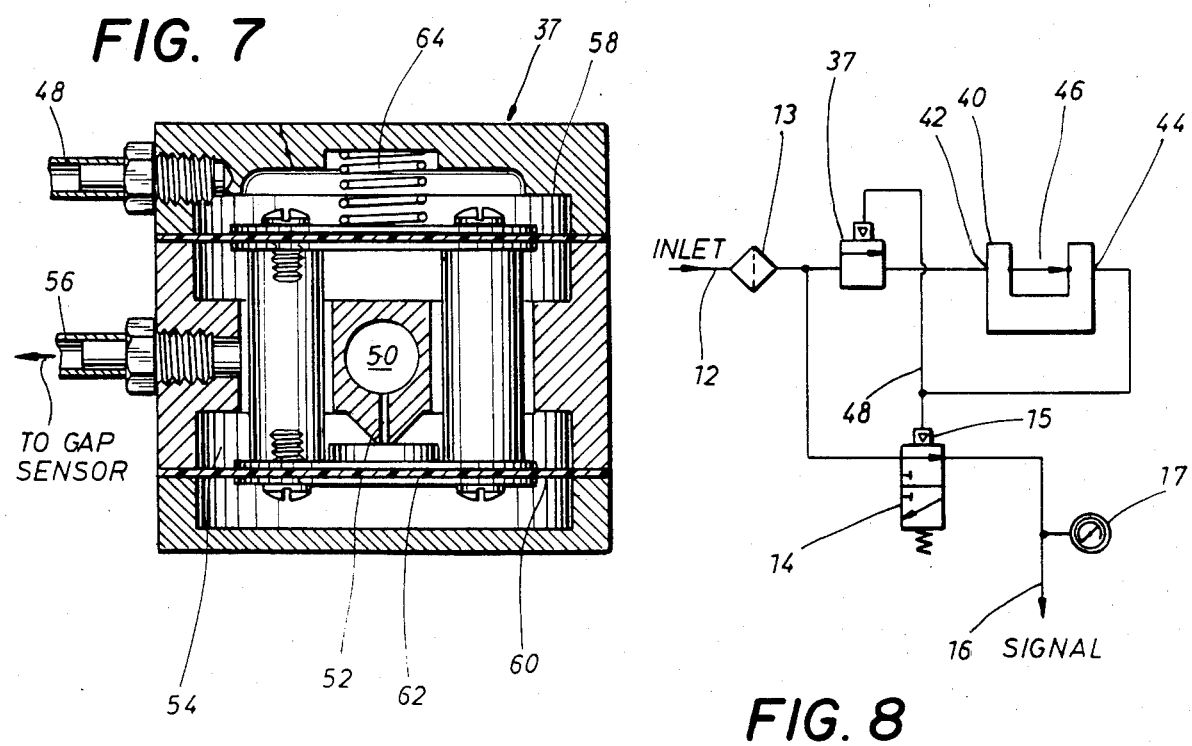
FIG. 7
FIG. 8

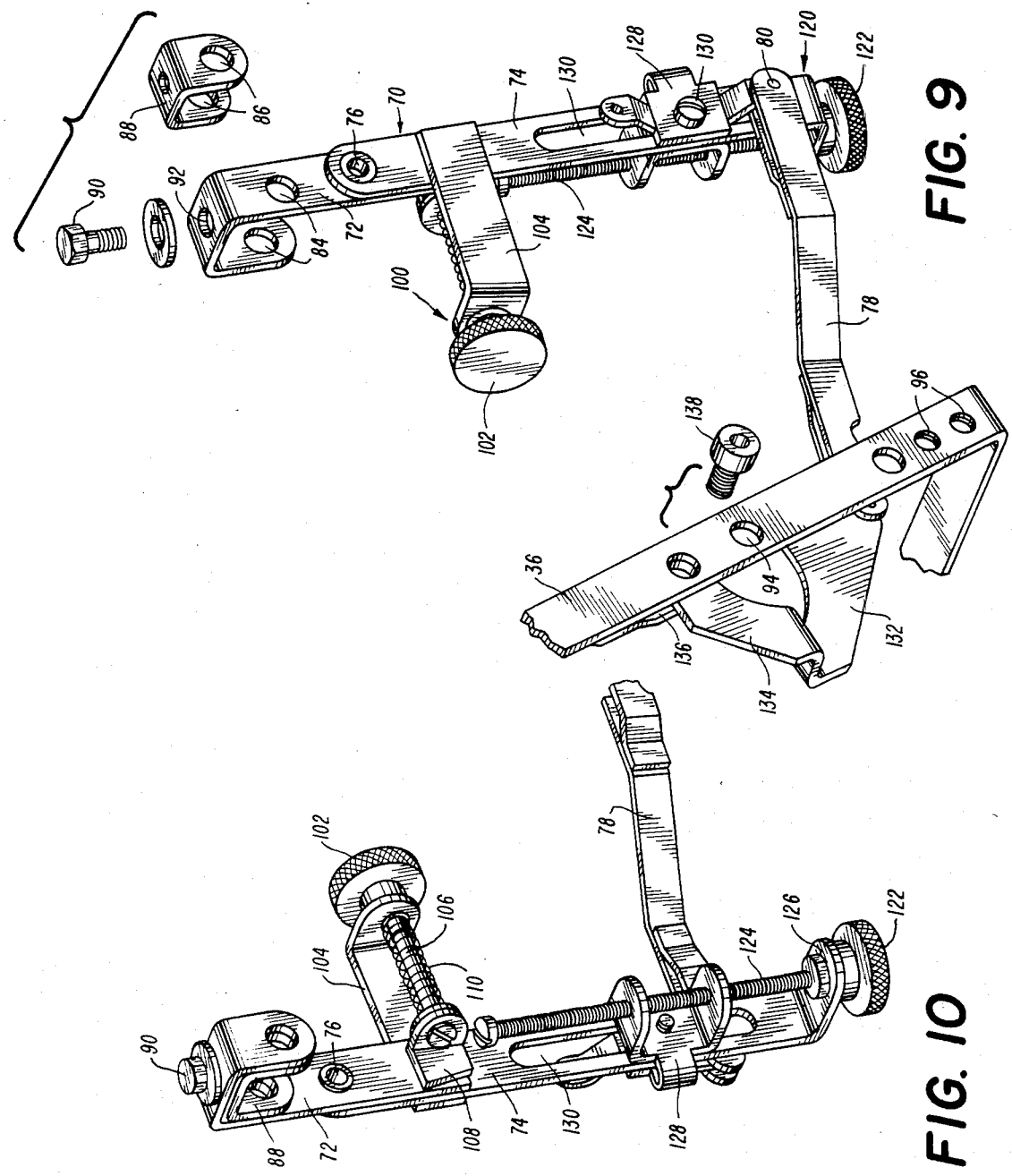

1

GAS HIGH-LOW PRESSURE CONTROL APPARATUS

BACKGROUND OF THE INVENTION

It is known to utilize a gas and/or oil high-low pressure control apparatus having a helical bourdon tube sensing a gas and/or oil control pressure and a gap sensor connected to a pressure indicator and rotating between high and low set flags in which the gap sensor controls a pilot actuated valve for controlling a gas supply.

The present invention is directed to various improvements in such an apparatus which increases its life, provides overrange protection, provides a positive snap acting control, an integral gap sensor clean-out, and ease and accuracy of adjustment.

SUMMARY

The present invention is directed to an improvement in a high-low pressure control apparatus having a helical bourdon tube sensing a gas/oil control pressure and a gap sensor connected to a pressure indicator and rotating between high and low set flags in which the gap sensor controls a pilot actuated valve controlling the air supply. One feature of the present invention is the provision of a pressure regulator connected between the gas supply and the inlet to the gap sensor in which the outlet of the gap sensor is connected to the valve and the outlet is also connected to and provides a regenerative feedback signal to the regulator. This provides a snap action closing operation of the valve when the gap sensor encounters a set flag. Preferably, the control valve is a three-way normally closed valve providing a quick bleed to zero.

Still a further object of the present invention is wherein the gap sensor is of a thermoplastic having an aligned inlet and outlet and a closible opening aligned with the inlet and the outlet for periodically cleaning the inlet and the outlet.

Still a further object of the present invention is wherein the linkage between the bourdon tube and the gap sensor includes a first link connected to the bourdon tube with a second link pivotally connected to the first link. A zero adjustment is connected between the first and second links for moving the first and second links relative to each other for adjusting the zero of the apparatus. A third link is pivotally connected to the second link and a span adjustment is connected between the second link and the third link for moving the pivot connection between the second and third links. The third link is connected to and moves the gap sensor and pressure indicator.

Yet a further object is wherein the first and second links are generally longitudinally aligned with each other and the zero adjustment rotates the longitudinal alignment between the first and second links.

Still a further object is wherein the zero adjustment is spring-loaded towards the adjusted position for protecting the linkage in the event the pressure indicator encounters an object when the apparatus is overpressured.

Yet a still further object is wherein the second and third links are positioned approximately perpendicular to each other and the span adjustment moves the pivot connection between the second and third links longitudinally along the second link.

Still a further object is wherein the third link is adjustably connected to the pressure indicator to provide a linearity adjustment.

Other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

FIG. 1 is a perspective elevational view of the apparatus of the present invention with the door opened, FIG. 2 is a reduced perspective elevational view of the backside of the apparatus, FIG. 3 is an enlarged fragmentary perspective view of the gap sensor of the present invention, FIG. 6 is an enlarged elevational view, in cross section, of the regulator of the present invention, FIG. 7 is a cross-sectional view taken along the line 7—7 of FIG. 6, FIG. 8 is a schematic of the control circuitry of the present invention, FIG. 9 is an enlarged, exploded, and fragmentary perspective view of the linkage of the present invention, and FIG. 10 is a partial and fragmentary, enlarged, perspective view of a portion of the backside of linkage of FIG. 9.

DESCRIPTION OF THE PREFERRED EMBODIMENT

Figure 4:
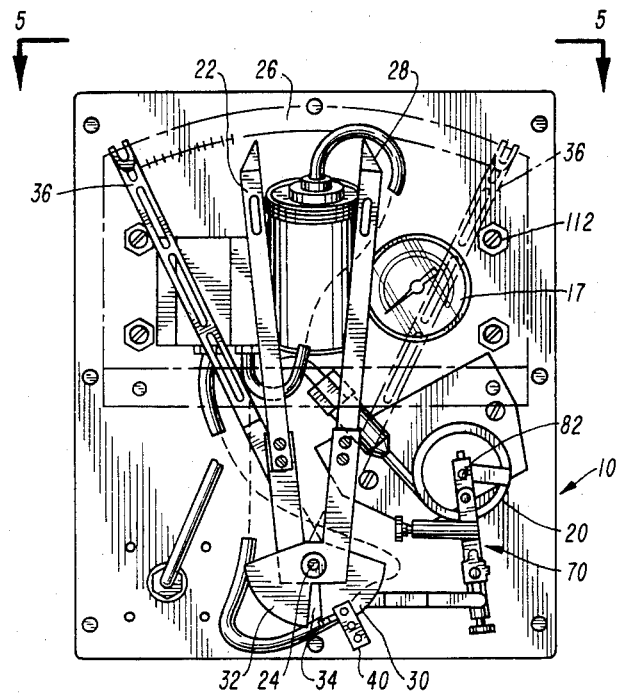
FIG. 4 is an elevational view of the apparatus of the present invention.
Figure 5:
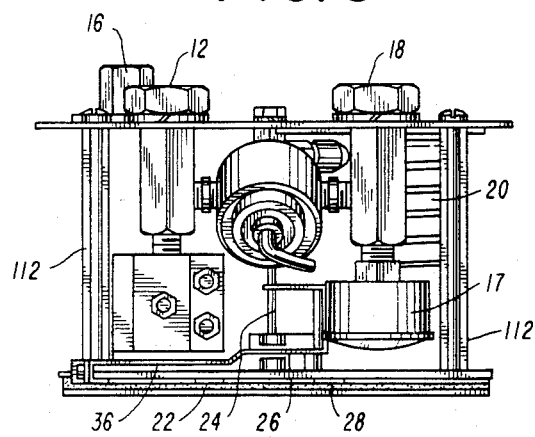
FIG. 5 is a cross-sectional view taken along the line 5—5 of FIG. 4.

Referring now to the drawings, particularly to FIGS. 1–5 and 8, the apparatus of the present invention is generally indicated by the reference numeral 10 and is a gas, generally pneumatic, high-low pressure control apparatus which functions as a gas switch providing an "on-off" gas output signal controlled by high and low process control set points. Thus, a gas or air inlet 12 is provided which passes through a control valve 14 to an output 16. A process control pressure is connected to a port 18 and is sensed by a helical bourdon tube 20.

It is desired to keep the process pressure at port 18 within predetermined high/low set points. The low set point is controlled by manually rotating low point set pointer 22 about pivot point 24 to the desired pressure value on the scale 26. The high set point is set by manually rotating high set pointer 28 about the pivot point 24 to the desired high set point on the scale 26. Each of the pointers 22 and 28 include flag sections such that pointer 22 includes a flag section 30 and pointer 28 includes a flag section 32. Thus, a space 34 exists between the flags 30 and 32 and its size depends upon the pressure difference or span between the pointers 22 and 28.

A pressure indicator 36 is pivotally mounted on the pivot point 24 and connected to a gap sensor 40 which senses when the control pressure, which is indicated by the pressure indicator 36 is within the set points 22 and 28. That is, the inlet air through line 12 flows out line 16 so long as the process control pressure, as measured by bourdon tube 20 and as indicated by the pressure indicator 36, is within the high/low set point range set by the pointer 22 and 28. The output 16 is off when the control pressure is on or below the low set point 22 or on or above the high set point 28 as indicated by the flags 30 and 32, respectively.

As shown in FIG. 1, the control pressure as indicated by the pressure indicator 36 is below the low set point 22 and thus the output gas 16 would be shut off. And in FIG. 4, the pressure indicator 36 indicates that the control pressure is above the high set point 28 and the outlet pressure at 16 would be shut down.

The gap sensor 40 senses the gap 34 between the flags 30 and 32 as it and the pressure indicator 36 are rotated by the bourdon tube 20 in response to the control pressure at port 18. The supply pressure enters at 12, passes through a filter 13, and reaches the input of a pressure regulator 37 and the input of the control valve 14. In normal operation the gap sensor 40 is positioned between the flags 30 and 32 and there is no obstruction between the inlet 42 and the outlet 44 of the gap sensor 40. Therefore, regulated air pressure crosses the gap 46 in the form of a jet of gas from the inlet 42 to the outlet 44. The pressure at the outlet 44 is applied to the pilot cap 15 of the valve 14 causing the valve 14 to remain in the open position and provide supply of pressure to the outlet port 16. A gauge 17 may be provided to measure the output pressure as well as the pressure indicator 36. When a high or low process control pressure occurs, either the high or low flags 32 and 30, respectively, is positioned in the gap 46 blocking the air from the inlet 42 to the outlet 44 of the gap sensor 40. Therefore, the output pressure from the output 44 to the pilot cap 15 drops causing the valve 14 to close and bleed the output pressure 16.

One of the features of the present invention is the provision of a regeneration feature to provide a snap action closing of the valve 14 by quickly bleeding the air through the gap sensor 40 to zero. This is provided by a regenerative feedback signal 48 from the outlet 44 of the gap sensor 40 to the regulator 37. Referring now to FIGS. 6 and 7, the regulator 37 includes an inlet 50 for receiving inlet air from the filter 13 (FIG. 8) which passes through a nozzle 52 into a chamber 54 and to an outlet 56 to the gap sensor inlet 42. A pair of diaphragms 58 and 60 carry a pad 62 which normally blocks the nozzle 52. A spring 64 attempts to bias the pad 62 to the open position. In addition, the regenerative line 48 from the outlet 44 of the gap sensor 40 is fed into the chamber 54 on one side of the diaphragm 58 for biasing the nozzle 52 to the open position. Thus, the input air through the inlet 50 acts to overcome the diaphragms to provide air through the outlet 56 to the gap sensor. However, the diaphragms 58 and 60 act to carry the pad 62 to regulate the flow of air. In normal operation, the outlet air from the gap sensor 40 passes through the regenerative line 48 and into the regulator 37 to act in a direction to keep the regulator open. However, when the gap sensor 40 senses a flag, the air in the regenerative line 48 is reduced thereby acting to close the regulator 36 which further reduces the output 44 from the gas sensor to act on the control valve 14 with a snap action for shutting off the supply air from the outlet 16.

Referring now to FIG. 3, the gap sensor 40 of the present invention is best seen. The sensor 40 has the inlet 42 which receives air and transmits the air through the gap 46 to the outlet 44 which is aligned with the inlet 42. Thus, when movement of the gap sensor 40 encounters one of the flags 30 and 32 in the gap 46 the signal air from the inlet 42 is blocked from entering the outlet 44. Prior art gap sensors 40 were made of aluminum and were subjected to frequent failures from the buildup of aluminum oxide in the inlet 42 and outlet 44 causing a spurious output signal. The present invention uses a thermosetting plastic for the gap sensor 40 and the one sold under the trademark "Delrin" has been found to be satisfactory. However, in order to provide periodic maintenance and cleanout of the inlet 42 and outlet 44 a closible opening 43 has been provided, in alignment with inlet 42 and outlet 44, which may be closed by a screw 45. Periodically removing the screw 45 and inserting a cleaner through the inlet 42 and outlet 44 insures a proper operation of the gap sensor 40.

Referring now to FIGS. 1, 4, 9 and 10, the structure and operation of the linkage 70 between the bourdon tube 20 and the gap sensor 40 and pressure indicator 36 is best seen. The linkage 70 includes a first link 72 connected to the bourdon tube, a second link 74 pivotally connected to the first link around pivot point 76, and a third link 78 pivotally connected to the second link 74 by a pivot point 80 and also adjustably connected to the pressure indicator 36 which carries the gap sensor 40. The first linkage 72 is adapted to be connected to the bourdon tube stem 82 through the openings 84 of the first linkage 72 and the openings 86 of the clevis 88. The clevis nut 90 is screwed down through the opening 92 and onto the boudon tube stem 82 to secure the first link 72 to the bourdon tube 20 whereby movement of the bourdon tube in response to the control pressure will be applied to the linkage 70.

The movement of the linkage 70 in response to the bourdon tube 20 is transmitted through the links 72, 74 and 78 to the pressure indicator or pointer 36 which includes an opening 94 for rotating around pivot point 24. In addition, the pointer 36 carries the gap sensor 40 which is attached to the pointer 36 through the openings 96.

A zero adjustment generally indicated by the reference numeral 100 is provided between the first link 72 and the second link 74 That is, with zero pressure on the apparatus, the pointer indicator 36 is zeroed on the pressure scale 26 by adjusting the thumbscrew 102. The thumbscrew 102 is connected to a bracket 104 which is secured to one of the links such as 74. The thumbscrew 102 is threadably connected to the bracket 104 and drives a stem 106 which is slidably connected to a second bracket 108. A spring 110 is provided between the brackets 104 and 108 for spring loading the bracket 108 towards the adjusted position. The zero adjustment means 100 not only provides a zero adjustment, but provides an overrange protection for the linkage in the event that pressure beyond the normal range of the instrument is encountered.

That is, as best seen in FIG. 4, in the event that the pressure is beyond the range of the instrument, the pressure indicator 36 will be driven offscale and will contact a pin 112. Any further increase in pressure would damage the linkage. However, when this occurs, the links 72 and 74 will rotate relative to each other about the pivot point 76 against the spring 110 to prevent damage to the measuring linkage. When the overpressure is reduced the spring 110 will return the links 72 and 74 to their normal operating positions.

A span adjustment generally indicated by the reference numeral 120 is provided between the second link 74 and the third link 78. After zeroing the instrument with the zero adjustment 100, full range pressure is applied to the apparatus 10 and the position of the pointer 36 relative to the scale 26 is noted. The thumbscrew 122 of the span adjustment 120 is adjusted to place the pointer 36 at full scale value. Re-zeroing is necessary each time a span adjustment is made.

It is noted that the third link 78 is approximately perpendicular to the second link 74. The span adjustment includes a screw 124 threadably connected to a bracket 126 which drives a carriage 128 in a longitudinal slot 130 in the second arm 74. A lock nut 130 is provided to lock the span adjustment 120 after adjustment.

A linearity adjustment is not usually required after the apparatus 10 has been initially assembled and calibrated. However, a linearity adjustment is provided in that the third link 78 includes a bracket 132 having an end 134 which is movable in a slot 136 in the pointer arm 36. A linearity adjustment nut 138 is provided whereby the end 134 of the link 78 may be suitably adjusted relative to the pointer arm 36.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. In a gas high-low pressure control apparatus having a helical bourdon tube sensing a control pressure and a gap sensor connected to a pressure indicator and rotating between high and low set point flags in which the gap sensor controls a pilot actuated valve controlling a gas supply the improvement comprising,
   a pressure regulator connected between the gas supply and the inlet to the gap sensor,
   the outlet of the gap sensor connected to the valve, said outlet also providing a regenerative feedback signal to the regulator for providing a snap acting closing operation of the valve when the gap sensor detects a flag.

2. The apparatus of claim 1 wherein the valve is a three-way normally closed valve.

3. The apparatus of claim 1 wherein the gap sensor is of a thermoplastic having an aligned inlet and outlet, and
   a closible opening aligned with the inlet and the outlet for periodically cleaning the inlet and outlet.

4. The apparatus of claim 1 including a linkage between the bourdon tube and the gap sensor comprising,
   a first link connected to the bourdon tube,
   a second link pivotally connected to the first link,
   a zero adjustment connected between the first and second links for moving said first and second links relative to each other for adjusting the zero of the apparatus,
   a third link pivotally connected to the second link,
   a span adjustment connected between the second link and the third link for moving the pivot connection between the second and third links, and
   said third link connected to and moving the gap sensor and pressure indicator.

5. The apparatus of claim 4 in which,
   the first and second links are generally longitudinally aligned and the zero adjustment rotates the longitudinal alignment between the first and second links.

6. The apparatus of claim 5 wherein,
   the zero adjustment is spring loaded toward the adjusted position for protecting the linkage in the event the pressure indicator encounters an object when the apparatus is overpressured.

7. The apparatus of claim 4 wherein the second and third links are positioned approximately perpendicular to each other and the span adjustment moves the pivot connection between the second and third links longitudinally along the second link.

8. The apparatus of claim 7 wherein the third link is adjustably connected to the pressure indicator to provide a linearity adjustment.

9. In a gas high-low control apparatus having a helical bourdon tube sensing a control pressure and connected to a pressure indicator connected to a gap sensor which is rotated about a pivot point and between high and low set point flags in which the gap sensor controls a pilot actuated valve which controls the gas gas supply, the improvement comprising,
   a first link connected to the bourdon tube,
   a second link pivotally connected to the first link, said first and second links being generally longitudinally aligned,
   a zero adjustment connected between the first and second links for rotating the longitudinal alignment between the first and second links for adjusting the zero of the apparatus,
   a third link pivotally connected to the second link and positioned approximately perpendicular to the second link,
   a span adjustment connected between the second link and the third link for moving the pivot connection between the second link and the third link longitudinally along the second link for adjusting the span reading of the apparatus,
   said third link connected to and moving the pressure indicator and gap sensor at a point offset from the pivot point of the pressure indicator.

10. The apparatus of claim 9 wherein the zero adjustment is spring loaded toward the adjusted position but allows movement of the first and second links in the event the pressure indicator is overpressured thereby protecting the linkage.

11. The apparatus of claim 9 wherein the third link is adjustably connected to the pressure indicator to provide a linearity adjustment.

* * * * *